United States Patent
Mukasa

(10) Patent No.: US 6,859,599 B2
(45) Date of Patent: Feb. 22, 2005

(54) OPTICAL FIBER, AND OPTICAL AMPLIFIER AND TRANSMISSION SYSTEM INCLUDING THE OPTICAL FIBER

(75) Inventor: Kazunori Mukasa, Chiyoda-ku (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 159 days.

(21) Appl. No.: 10/367,866

(22) Filed: Feb. 19, 2003

(65) Prior Publication Data

US 2003/0161600 A1 Aug. 28, 2003

(30) Foreign Application Priority Data

Feb. 19, 2002 (JP) ........................................ 2002-041921

(51) Int. Cl.[7] .................................................. G02B 6/02
(52) U.S. Cl. ...................................... 385/127; 385/124
(58) Field of Search ................................ 385/123–128

(56) References Cited

U.S. PATENT DOCUMENTS

| | | | |
|---|---|---|---|
| 6,178,279 B1 | 1/2001 | Mukasa et al. | 385/123 |
| 6,470,126 B1 | 10/2002 | Mukasa | 385/123 |
| 6,661,958 B2 * | 12/2003 | Hirano et al. | 385/127 |
| 2001/0028491 A1 | 10/2001 | Mukasa | 385/147 |
| 2002/0012509 A1 | 1/2002 | Mukasa | 385/123 |
| 2002/0051611 A1 | 5/2002 | Mukasa | 385/123 |
| 2002/0176678 A1 | 11/2002 | Mukasa | 385/127 |
| 2003/0063881 A1 * | 4/2003 | Hebgen et al. | 385/127 |
| 2003/0118304 A1 * | 6/2003 | Shibuta | 385/124 |
| 2003/0147610 A1 * | 8/2003 | Tsukitani et al. | 385/127 |
| 2003/0210878 A1 * | 11/2003 | Kumano et al. | 385/127 |

FOREIGN PATENT DOCUMENTS

WO   WO 00/50935   8/2000

OTHER PUBLICATIONS

Sugizaki et al., *Polarization Insensitive Broadband Transparent DCF Module with Faraday Rotator Mirror, Raman–Amplified by Single Polarization Diode–Laser Pumping*, OFC '99 I00C, Feb. 23, 1999, pp. 279–281.
Sugizaki et al., *Slope Compensating DCF for S–Band Raman Amplifier*, Optical Amplifiers and Their Application, Jul. 1–4, 2001, OtuB 6–1 to OtuB 6–3.
U.S. Appl. No. 10/184,802 filed Jul. 1, 2002, Specification, Claims, Abstract, and Drawings.
U.S. Appl. No. 10/266,741 filed Oct. 9, 2002, Specification, Claims, Abstract, and Drawings.
U.S. Appl. No. 09/673,248 filed Oct. 23, 2000, specification, claims, abstract, and drawings.

* cited by examiner

*Primary Examiner*—Frank G. Font
*Assistant Examiner*—Eric Wong
(74) *Attorney, Agent, or Firm*—Eric J. Robinson; Robinson Intellectual Property Law Offiice, P.C.

(57) ABSTRACT

Optical fibers with high non-linearity and low dispersion suitable for the Raman amplification are offered. Their structural and characteristic specifics are as follows: first core 1 with α profile surrounded with second core 2, further second core surrounded with cladding 5; setting first core 1 for no less than 1.8% of relative refractive index difference from cladding 5; setting second core 2 for no more than −0.4% of relative refractive index difference from cladding 5, setting α for 1.5 or larger, making second core 2 at least 2.2 times as large as first core 1 in diameter; and an effective area of no more than 15 $\mu m^2$, a dispersion slope of 0.05 ps/$nm^2$/km or lower in absolute value, a dispersion of no less than 5 ps/nm/km and no more than 20 ps/nm/km, in absolute value, a cutoff wavelength of 1350 nm or shorter, and a bending loss of 5.0 dB or lower in a bending diameter of 20 mm, each at a wavelength of 1.55 $\mu$m.

11 Claims, 6 Drawing Sheets

OPTICAL FIBER, AND OPTICAL AMPLIFIER AND TRANSMISSION SYSTEM INCLUDING THE OPTICAL FIBER

BACKGROUND OF THE INVENTION

The present invention relates to optical fibers suitable for the Raman amplification, and optical amplifier and optical transmission system, which involve the optical fiber.

Wavelength Division Multiplexing (WDM) transmission, which enables high-capacity transmission by transmitting plural optical signals through a single optical fiber, has been in widespread use in the field of telecommunications.

The Er-Doped Fiber Amplifier (EDFA) is developed and used for the relay points in a WDM transmission system. In addition, optical fibers doped with other rare earth elements than erbium are under study for the optical-amplification. The amplification with rare-earth doped optical fibers needs no transformation from optical signals to electric signals at every wavelength in the preceding relay points, thereby giving an impetus to the spread of WDM transmission.

Meanwhile, Raman amplifiers with the Raman amplification are arresting attention as a novel optical amplifier. For instance, Distributed Raman Amplification is eagerly investigated to improve the transmission characteristics by applying to an optical transmission line as a Raman amplification component.

Moreover, as authoritative reports in Tus5, OFC'99 and OtuB6, Optical Amplifiers and Their Applications 2001 presented, Discrete Raman Amplification is under vigorous study, using a DCF (dispersion compensating fiber) for single-mode fiber (SMF). The study is designed to attach the DCF with a function of optical amplification.

The Raman amplification is a technique to utilize induced emission in Raman scattering for the amplification of optical signals, by a frequency of 13.2 T Hz lower than that of the pump light source (roughly on the 100–110 nm longer wavelength side ). The amplification efficiency depends largely on the non-linearity of an optical fiber. In general, the higher in non-linearity of optical fiber, the more in Raman amplification efficiency.

The above DCF was designed in some cases for a purpose to compensate the positive dispersion arising in a single-mode optical fiber or a non-zero dispersion-shifted fiber (NZ-DSF) with the zero-dispersion shifted to a wavelength slightly off 1.55 µm, as short length as possible. Therefore, the DCF has a negative dispersion of no more than −70 ps/nm/km at a wavelength of 1.55 µm (hereinafter referred to as "at 1.55 µm"), and an effective area of 15–20 µm$^2$ at 1.55 µm.

The DCF, which has a small effective area and a high non-linearity, is extremely suitable for a Raman amplification component.

SUMMARY OF THE INVENTION

However, when the Raman amplification is applied to a transmission without dispersion compensation, a larg absolute-value of negative dispersion of the DCF leads to deterioration of the transmission characteristics.

In other words, it is unsuitable to apply the DCF to the Raman amplification in a transmission system that needs no dispersion compensation, because meticulous and elaborate control over dispersion is required for the current trend toward high-bit-rate, high-capacity transmission. But, an optical fiber for the Raman amplification, which is applied to a transmission system without dispersion compensation, has not fully been studied.

The present invention provided solution to the above problem, without affecting the managed dispersion in an optical transmission line, and to implement an efficient Raman amplification therein. Consequently, the suitable optical fiber according to the present invention was provided for a light source and an amplifier, along with optical amplifiers and optical transmission systems involving the optical fibers according to the present invention.

To accomplish the object discribed above, an optical fiber according to an aspect of the present invention has an effective area of no more than 15 µm$^2$ at 1.55 µm, a dispersion slope of no more than 0.05 ps/nm$^2$ in absolute value, a dispersion of no less than 5 ps/nm/km and no more than 20 ps/nm/km in absolute value at 1.55 µm, and a cutoff wavelength of no more than 1400 nm (preferably no more than 1350 nm) and a bending loss of no more than 5.0 dB/m in a bending diameter of 20 mm.

An optical fibers according to another aspect of the present invention has a core with at least two layers, which consists of a first core at the center and a layer or a plurality of layers surround the first core. Concurrently, at least one of the layer surrounds the first core has a relative refractive index difference of no more than −0.4%, from a cladding.

BRIEF DESCRIPTION OF THE DRAWINGS

FIG. 1(B) presents a cross section of an optical fiber conforming to the refractive index profile in FIG. 1(A).

FIG. 4(B) presents a cross section of an optical fiber conforming to the refractive index profile in FIG. 4(A).

DESCRIPTION OF THE PREFERRED EMBODIMENTS

Figure 1:
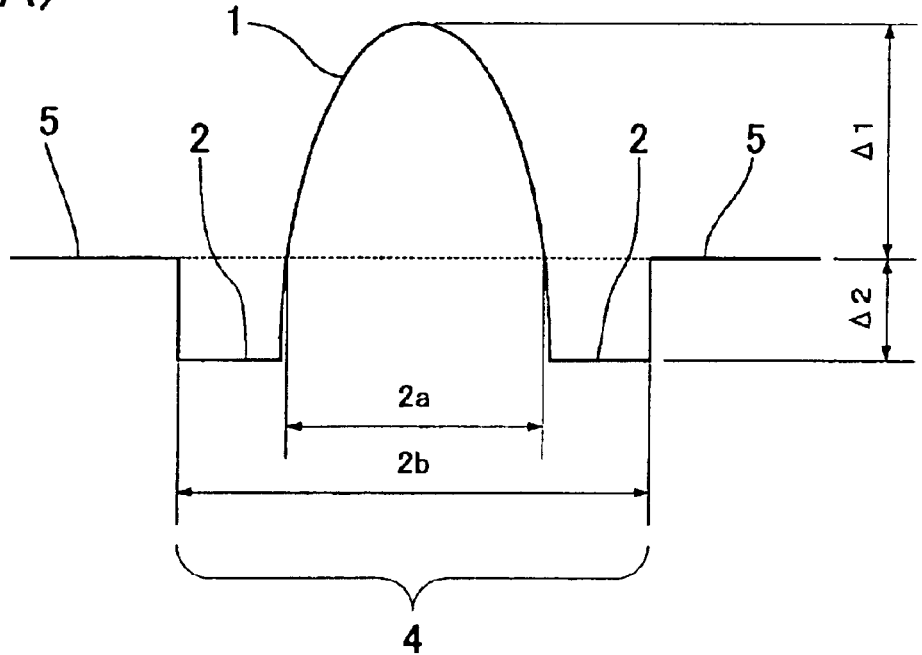
FIG. 1(A) and FIG. 1(B) are explanatory diagrams of the refractive index profile in the first embodiment of the invention.
Figure 1:
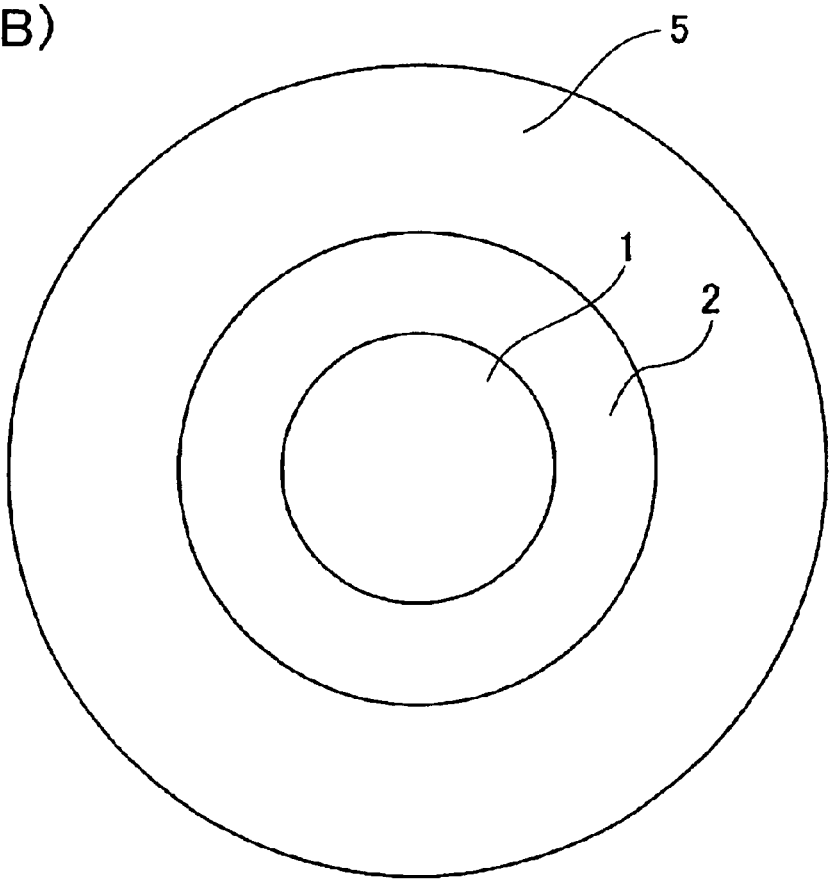

Embodiments for the present invention are now explained with reference to the attached drawings. FIG. 1(A) shows a profile of refractive indices for the first embodiment of the present invention. Various refractive index profiles are compatible with the invention, but the first embodiment applied a W-shape profile as shown in FIG. 1(A), which is comparatively simple and easy to design and control.

The optical fiber in the first embodiment has core 4 surrounded with cladding 5, and core 4 has first core higher than cladding 5 in refractive index. Also, second core 2 borders first core 1 and surrounds first core 1, and remains lower than cladding 5 in refractive index.

In particular, first core 1 has an α profile (given α=no less than 1.5), and a relative refractive index difference (Δ1) of no less than 1.8%, from cladding 5; second core 2 has a relative refractive index difference (Δ2) of no less than −0.4%, from cladding 5, and a preferable value for Δ2 is no more than −0.6%.

This patent specification applies the following formulae (1), (2) and (3) to define (Δ1), (Δ2), respectively:

$$\Delta 1 = \{(nc1 - nS)/nc1\} \times 100 \quad (1)$$

where "nc1" denotes the maximum refractive index of first core 1 and "nS" denotes the refractive index of cladding 5.

$$\Delta 2 = \{(nc2 - nS)/nc2\} \times 100 \quad (2)$$

where "nc2" denotes the minimum refractive index of second core 2.

$$n(r) = nc1 \cdot \{1 - 2 \cdot \Delta 1 \cdot (r/a)^\alpha\}^{1/2} \quad 0 \leq r \leq a \quad (3)$$

where "r" denotes a given point on a fiber radius (r=0: at the core center);

"n(r)" denotes the refractive index at a given "r".

Additionally, the diameter of second core 2 is at least 2.2 times as large as that of first core 1 in the first embodiment.

Here, diameter 2a of first core 1 is defined as a diametric length of first core 1, on which, both the ends share the identical refractive indexes with cladding 5.

Similarly, diameter 2b of second core 2 is defined as a diametric length of second core 2 which, on the border of cladding 5, twice butts onto a locus indicating ½ of the difference in refractive index (Δ2) between cladding 5 and second core 2.

The first embodiment has the above refractive index profile and is equipped with the following key characteristic and parametric values; namely, an effective area of no more than 15 $\mu m^2$ at 1.55 $\mu m$, a dispersion slope of no more than 0.05 ps/nm$^2$/km in absolute value and a dispersion of no less than 5 ps/nm/km and no more than 20 ps/nm/km in absolute value at 1.55 $\mu m$.

The optical fiber in the first embodiment has a cutoff wavelength of no longer than 1400 nm (preferably no longer than 1350 nm) and a bending loss of no more than 5.0 dB/m in a bending diameter of 20 mm.

The optical fiber in the first embodiment is adjusted to a zero-dispersion wavelength of no longer than 1400 nm or no shorter than 1650 nm, and with a transmission loss of no more than 1.0 dB/km at 1.55 $\mu m$.

As mentioned above, the optical fiber in the first embodiment has high non-linearity because of its small effective area less than 15 $\mu m^2$ at 1.55 $\mu m$ and enables high efficiency Raman amplification. The Raman amplification efficiency will more improve with a least possible effective area. Specifically, the effective area at 1.55 $\mu m$ would preferably be 10 $\mu m^2$ or less.

The optical fiber in the embodiment is adjusted to an absolute-value range of dispersion between 5 ps/nm/km and 20 ps/nm/km, which enables a managed dispersion in an optical transmission line to remain undisturbed. In turn, a maximum possible fiber length for the Raman amplification can seldom go over 20 km or thereabout, and with an absolute value of dispersion at 1.55 $\mu m$ (given a transmission span of 20 km) of 20 ps/nm/km or lower, the whole fiber dispersion will be suppressed to 400 ps/nm/km or lower.

Today, an optical transmission terrestrial line is in service, spanning 100 km, using a NZ-DSF with a dispersion of 4–5 ps/nm/km at 1.55 $\mu m$, where the whole dispersion results in 400 ps/nm.

Therefore, the inventor has designed an optical fiber for the Raman amplification, according to the optical fiber in the first embodiment, not to exceed 20 ps/nm/km at 1.55 $\mu m$, or not to exceed the total dispersion of the foregoing optical transmission terrestrial line with a NZ-DSF.

The whole dispersion varies with the transmission capacity; consequently, it is desirable for the dispersion at 1.55 $\mu m$ to be suppressed to a least tolerable value. At the same time, a dispersion spot which extremely lowers will induce Four Wave Mixing (FWM), which emerges starkly in regions of low dispersion. The optical fiber in the first embodiment is designed to have a dispersion of at least 5 ps/nm/km, and suppress FWM.

Notably, it is desirable for counteracting the FWM to perfection, to make the dispersion at 1.55 $\mu m$, no less than 10 ps/nm/km.

If a certain dispersion slope subsists in the optimized dispersion at 1.55 $\mu m$, the setting of the dispersion may be transferring at other wavelengths, not to be optimum. Accordingly, optical fibers for the Raman amplification would preferably have a dispersion slope without a threat to the performance of an optical transmission line. In short, the dispersion slope in absolute value of the optical fiber in the first embodiment would preferably be no more than the same slope in the optical transmission line.

In addition, for reference, conventional single-mode optical fibers or NZ-DSFs fall almost within a dispersion slope range of 0.05 to 0.07 ps/nm$^2$/km.

The optical fiber in the first embodiment designed to be of a dispersion slope no more than 0.05 ps/nm$^2$/km at 1.55 $\mu m$, can suppress a dispersion effect over a wide-band on each side of 1.55 $\mu m$. In particular, the less in the dispersion slope of absolute value at 1.55 $\mu m$, the more desirable for transmission.

Moreover, the optical fiber in the first embodiment as supposed to have a cutoff wavelength no longer than 1400 nm, can amplify optical signals over a wide-band astride the C-band and the L-band. Preferably, the cutoff wavelength in the first embodiment ought to be no longer than 1350 nm, thereby enabling the amplification to range over a broad range from the S-band to the L-band.

Notably in general, the S-band ranges from 1460 nm to 1520 nm, and the L-band, from 1565 nm to 1620 nm. The C-band is located between 1520 nm and 1565 nm as the in-between of both the bands, where the S, C and L-bands combine to form a broad stretch of wavelength The Raman amplification is set in action, by injecting pump light onto the 100–110 nm-shorter wavelength side over the transmission signals. Optical fibers for the Raman amplification need to have a cutoff wavelength shorter than that of pump light.

The optical fiber in the first embodiment has a cutoff wavelength no more than 1400 nm matching with the 100–110 shorter wavelength side over the C-band, with a design to cover at least the C-band and L-band. Preferably, the cutoff wavelength ought to be no longer than 1350 nm and 100–110 nm shorter than the shortest wavelength: 1460 nm over the S-band to cover up to the same band. As a result, the optical fiber in the first embodiment fulfills the above requirements.

The optical fiber in the first embodiment is made to show a bending loss of no more than 5.0 dB/m in a bending diameter of 20 mm at 1.55 $\mu m$, and thus enables coiling in a small diameter to be contained in a module with a least loss increase.

The ceiling bending loss: 5.0 dB/m at 1.55 µm in a bending diameter of 20 mm means to be equivalent to the counterpart in a DCF, or better. Preferably, the same fiber ought to be made no more than 1.0 dB/m in bending loss in a bending diameter of 20 mm at 1.55 µm.

The optical fiber in the first embodiment as designed to have a zero-dispersion wavelength shorter than 1400 nm or longer than 1650 nm, can favorably perform, by suppressing the FWM over a broad wavelength band astride the C-band and L-band. More desirably, considering covering up to the S-band, the zero-dispersion wavelength ought to be no longer than 1350 nm (preferably 1300 nm or shorter).

A transmission wavelength band involving a zero-dispersion wavelength in-between is more likely to bring on FWM. The inventor planned to make the optical fiber in the first embodiment, applicable astride the C-band and L-band. As a result, the same fiber was made not to have any zero-dispersion wavelength in a range between 1400 nm and 1650 nm, in view of the wavelengths of pump light and transmission signals.

In addition, as already mentioned, a zero-dispersion wavelength as set shorter than 1400 nm is favorable for covering a broader wavelength band, especially including the S-band.

Figure 2:
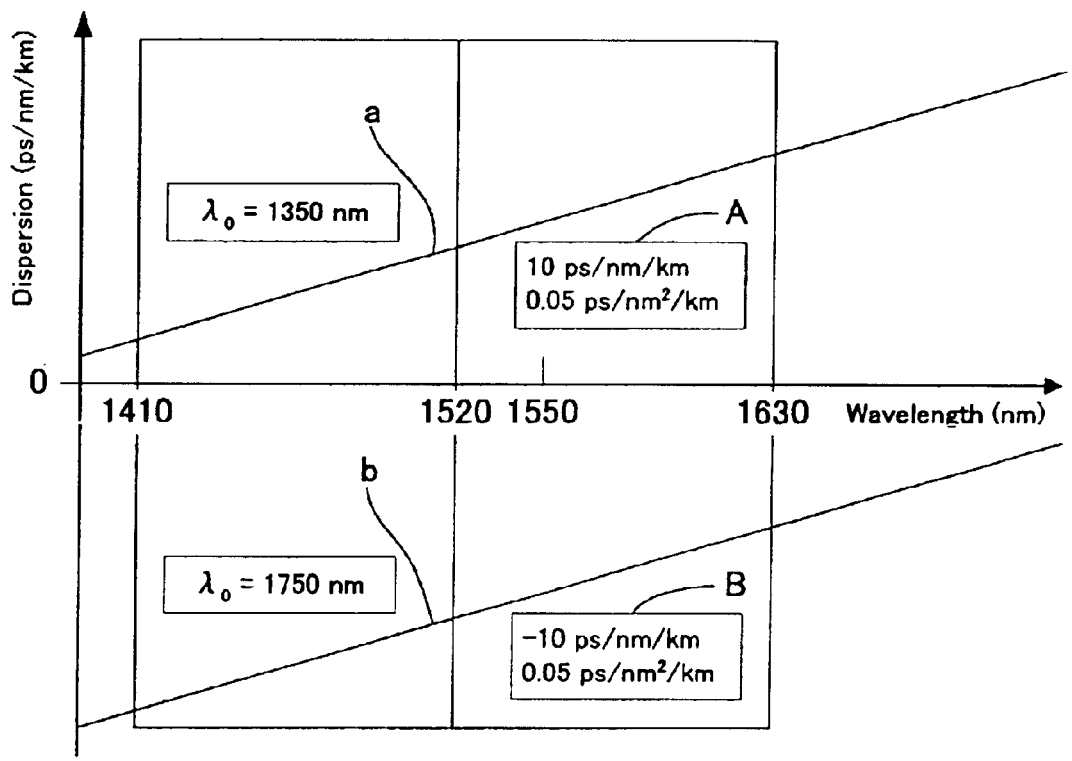
FIG. 2 is a pattern diagram plotting the correlation between zero-dispersion wavelength, dispersion, dispersion slope, Raman amplification wavelength band, and transmission wavelength band.

For instance, FIG. 2 shows curve "a", which refers to "Dispersion Vs. Wavelength" in an optical fiber with a zero-dispersion wavelength of 1400 nm or shorter: Raman Amplification and Transmission Wavelength Band.

The optical fiber conforming to curve "a" has key parameters at 1.55 µm as given in Box A, namely, +10 ps/nm/km of dispersion, 0.05/ps/nm$^2$/km of dispersion slope, round 1350 nm of zero-dispersion wavelength ($\lambda 0$). Therefore, the same fiber has a zero-dispersion wavelength neither in the transmission band, nor the Raman amplification band.

Moreover, FIG. 2 shows curve "b" which refers to "Dispersion Vs. Wavelength" in an optical fiber with a zero-dispersion wavelength of no shorter than 1650 m: Raman Amplification and Transmission Wavelength Band.

The optical fiber conforming to curve "b" has key parameters at 1.55 µm as given in Box B, namely, −10/nm/km of dispersion, 0.05/ps/nm$^2$/km of dispersion slope, round 1750 nm of zero-dispersion wavelength ($\lambda 0$). Therefore, the same fiber has a zero-dispersion wavelength neither in the transmission band nor the Raman amplification band.

In line with the above, the dispersion of at least 5 ps/nm/km in absolute value and the low dispersion slope at 1.55 µm, combine to make the zero-dispersion wavelength remain out of the transmission band and the Raman amplification band—favorable characteristic requirements.

The optical fiber in the first embodiment is made to have a transmission loss of no more than 1.0 dB/km at 1.55 µm, can result in a low total transmission loss. Singly enhancing the non-linearity in an attempt to raise the Raman amplification efficiency might finally have low amplification efficiency, should a transmission loss subsist in the optical fiber. Yet, the concern will not apply to the optical fiber in the first embodiment—no need for loss compensation, which has a considerably low transmission loss as already described.

The inventor gave the following studies, to specify refractive index profiles for the optical fiber in the first embodiment. In brief, at first studied in detail was a W-shape profile as shown in FIG. 1(A). The optical fiber with a W-shape profile is known as its advantage of ease in lowering the dispersion slope, by optimizing the second core 2 which has a lower refractive index than the cladding 5.

The W-shape profile is with the following parameters; namely, the relative refractive index ($\Delta 1$) of the first core 1, to the cladding 5, the relative refractive index ($\Delta 2$) of the second core 2, to the cladding 5, the diameter ratio (=a/b) of the first core 1 (2a) to the second core 2 (2b), "$\alpha$" of the $\alpha$ profile in the first core 1, the diameter (2b) of the second core 2. In particular, the relative refractive index ($\Delta 2$) is a powerful factor in forming a dispersion slope or an effective area.

As the case stood, the inventor studied on the relationship between dispersion, dispersion slope or effective area, and relative refractive index $\Delta 2$, given $\Delta 1$=2.4%, $\alpha$=6 and a/b= 0.3. The results are plotted in FIG. 3.

Figure 3:
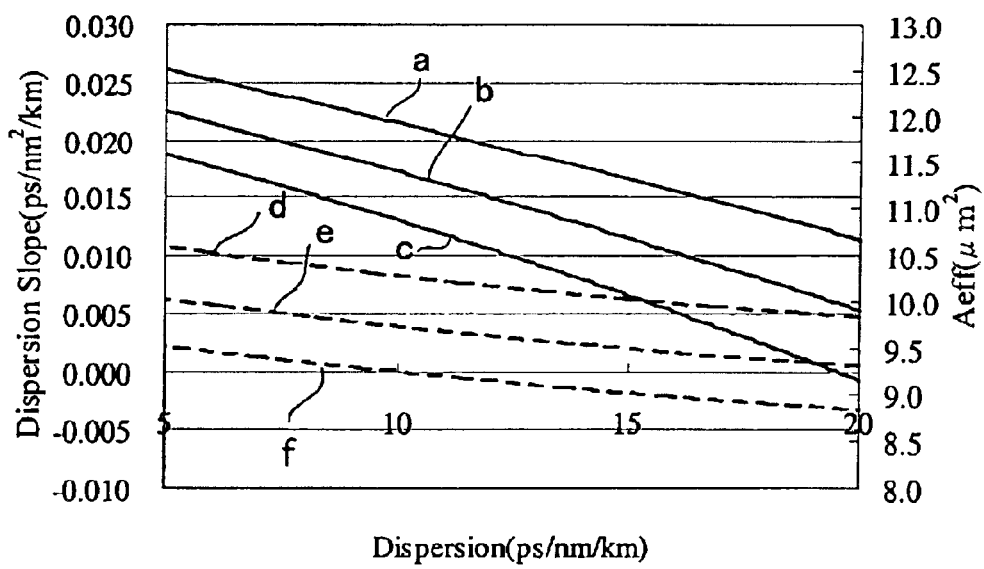
FIG. 3 is a graphics to plot characteristic curves resulting from variations in the relative refractive index difference of a first core from a cladding.

In FIG. 3, curve "a" represents the dispersion slope for $\Delta 2$=−0.5%, curve "b", the dispersion slope for $\Delta 2$=−0.7%, and curve "c", the dispersion slope for $\Delta 2$=−0.9%.

In addition, curve "d" represents the effective area for $\Delta 2$=−0.5%, curve "e", the effective area for $\Delta 2$=−0.7%, and curve "f", the effective area for $\Delta 2$=−0.9%.

The sample fibers used were optimized to fulfill the requirements: a cutoff wavelength of no longer than 1350 nm, a bending loss of no more than 5.0 dB/m in a diameter of 20 mm at 1.55 µm.

As apparent in FIG. 3, with a limitation on dispersion, the more in relative refractive index of absolute value $\Delta 2$, the less in dispersion slope and effective area.

Thus, the parameters were adjusted to assorted values on trial. Consequently, adjusting the relative refractive index ($\Delta 2$) to no more than −0.4% (preferably −0.6%) turned out to result in 5–20 ps/nm/km of dispersion in absolute value (preferably 10–20 ps/nm/km) at 1.55 µm, no more than 0.05/ps/nm$^2$/km of dispersion slope in absolute value at 1.55 µm, and no more than 15 µm$^2$ of effective area (preferably 10 µm$^2$). Notably, some other parameters were concurrently optimized.

Subsequently, as shown in FIG. 1(A), a W-shape profile was optimized in terms of the relative refractive index ($\Delta 1$), $\alpha$ and a/b, where a parameter adjustment took place, targeting on 10–20 ps/nm/km of dispersion in absolute value at 1.55 µm, no more than 0.05/ps/nm$^2$/m of dispersion slope in absolute value at 1.55 µm, no more than 10 µm$^2$ of effective area, no more than 1350 nm of cutoff wavelength and 5.0 dB/m of bending loss in 20 mm of bending diameter at 1.55 µm.

As a result, adjusting the relative refractive index ($\Delta 1$) to no less than 1.8%, relative refractive index ($\Delta 2$) to no more than −0.6%, and a to no less than 1.5 turned out to optimize the refractive index profile.

In short, being off the set parametric values as described above, with more than 10 µm$^2$ of effective area or even less, turned out to make the dispersion in absolute value at 1.55 µm drift from a range of 5–20 ps/nm/km, or the dispersion slope in absolute value at 1.55 µm grow larger than 0.05 ps/nm$^2$/km.

Moreover, a relative refractive index difference ($\Delta 2$) between −0.6% and −0.4% (higher than even −0.6%, but lower than −0.4%) enables adjusting to a range of 5–20 ps/nm/km of dispersion in absolute value at 1.55 µm, no more than 0.05 ps/nm$^2$/km of dispersion slope in absolute value at 1.55 µm, and a range of 10 µm$^{2-15}$ µm$^2$ of effective area.

Table 1 presents refractive index profiles and simulated characteristics at 1.55 µm in the first embodiment, with the aid of a computer simulation program.

TABLE 1

| Δ1 % | α | Δ2 % | a/b | Core Diameter μm | Dispersion ps/nm/km | Dispersion Slope ps/nm²/km | Aeff μm² | λc nm | Bending Loss dB/m |
|---|---|---|---|---|---|---|---|---|---|
| 2.2 | 10 | −0.70 | 0.32 | 10.7 | −14.2 | 0.009 | 9.4 | 1058 | 0.2 |
| 2.4 | 6 | −0.90 | 0.50 | 7.0 | −14.1 | −0.014 | 9.6 | 1080 | 0.1 |
| 2.1 | 6 | −0.90 | 0.30 | 10.9 | −17.2 | 0.001 | 9.7 | 936 | 0.3 |
| 2.4 | 2 | −0.90 | 0.30 | 12.0 | −13.1 | 0.016 | 9.9 | 983 | 0.5 |
| 2.4 | 5 | −0.70 | 0.48 | 6.9 | −18.0 | −0.004 | 10.0 | 1143 | 0.1 |
| 2.4 | 10 | −0.50 | 0.50 | 6.9 | −9.6 | 0.004 | 10.4 | 1169 | 0.1 |

In the tables attached hereto, including Table 1, Core Diameter denotes the diameter of second core 2; Slope, dispersion slope at 1.55 μm; Aeff, effective area; λc, cutoff wavelength; Bending Loss, bending loss in 20 mm diameter.

As apparent in Table 1, simulated optical fibers in the first embodiment are with high non-linearity and low dispersion, and can effectively perform in the Raman amplification without significantly disturbing the managed dispersion in an optical transmission line. The simulated optical fibers are best fit for futuristic Raman amplifiers, possibly including Discrete Raman Amplification.

Accordingly, sample optical fibers of the first embodiment can act as Raman amplifier components for the Raman amplification with high efficiency over a broad wavelength band. The simulated optical fibers in the first embodiment are connected to an optical transmission line to serve as Discrete Raman Amplifier components, which will not significantly disorder the managed dispersion, thus realizing a superior optical transmission system in combination with a highly efficient Raman amplification. For reference, the simulated optical fibers are each with a cutoff wavelength of 1350 nm or lower.

Figure 4A:
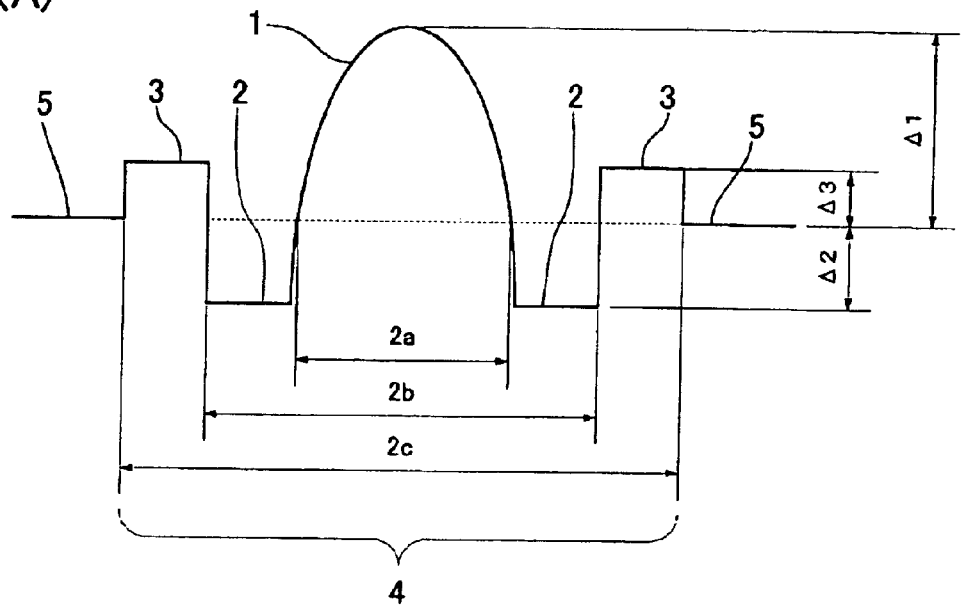
FIG. 4(A) and FIG. 4(B) are explanatory diagrams of the refractive index profile in the second embodiment of the invention.
Figure 4B:
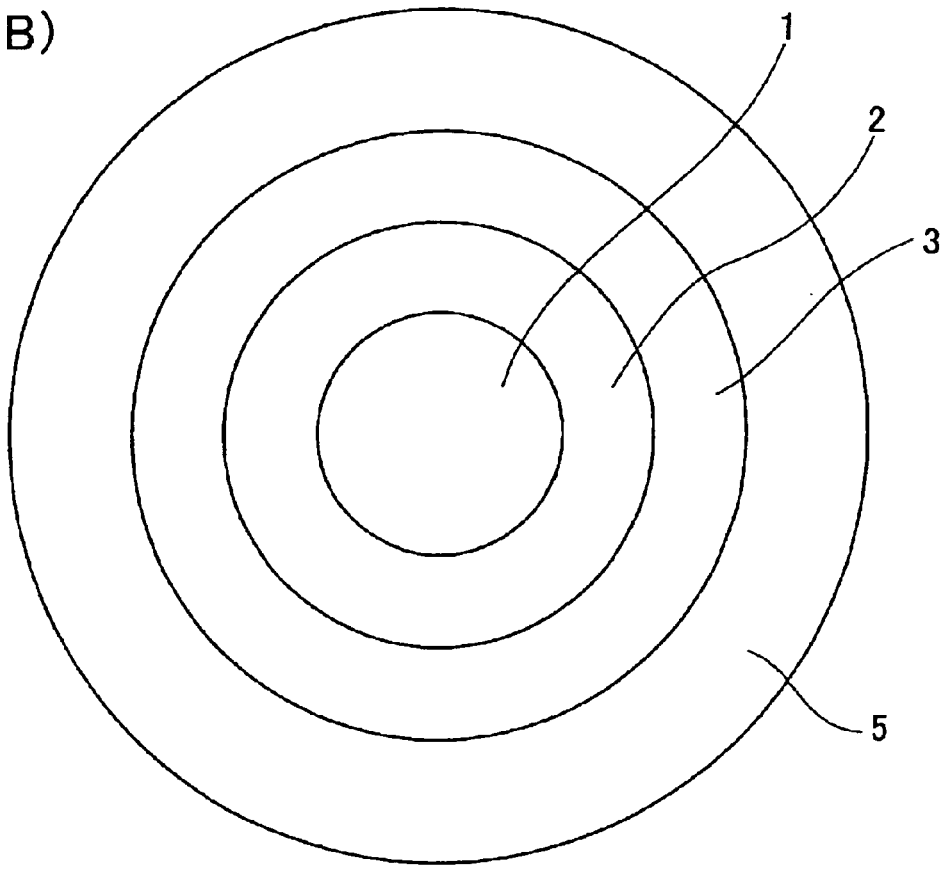

FIG. 4 plots refractive index profiles of simulated optical fibers in the second embodiment. The second embodiment is explained with part names and reference numbers common to the first embodiment as above described. The overlapped explanations are omitted or simplified.

Simulated optical fibers in the second embodiment are each with a core surrounded by a cladding as in the first embodiment, but the core is three layered (3 core layers), unlike the counterpart fibers in the first embodiment.

Each simulated optical fiber in the second embodiment is with a first core 1, and a second core 2, and a third core 3 neighbors the second core as located on the periphery. The third core 3 is higher in refractive index than the cladding, but lower than the first core. For reference, the refractive index profile concerned falls into a category of W-Segment profile.

As for each simulated optical fiber in the second embodiment, the third core is made to be no more than 0.45% of relative refractive index difference from the cladding, the third core is 1.8 times as large as the second core in outer diameter, or smaller.

The patent specification defines the relative refractive index difference (Δ3) of the third core 3 from the cladding as formulated below:

$$\Delta 3 = \{(n\,c3 - n\,S)/n\,c3 \times 100 \quad (4)$$

where n c3 denotes the maximum refractive index of the third core 3.

Excepting the third core, the second embodiment is structurally the same as the first embodiment. The inventor explains the optimization for the third core, from now onward.

At first, a task of optimization for the second embodiment was carried out, with a relative refractive index difference (Δ1) of 2.4%, α of 6, a/b of 0.3: diametric ratio of the first core 1 (2a) to the second core 2 (2b), and c/b of 1.5: diametric ratio of the third core 3 (2c) to the second core 2 (2b).

Here, the diameter (2c) of the third core 3 is defined as a diametric length of the third core 3 which, on the border of the cladding 5, twice butts onto a locus as raised from refractive index level 5, by 1/10 of the difference in relative index (Δ3) between the cladding 5 and the third core 3.

Figure 5:
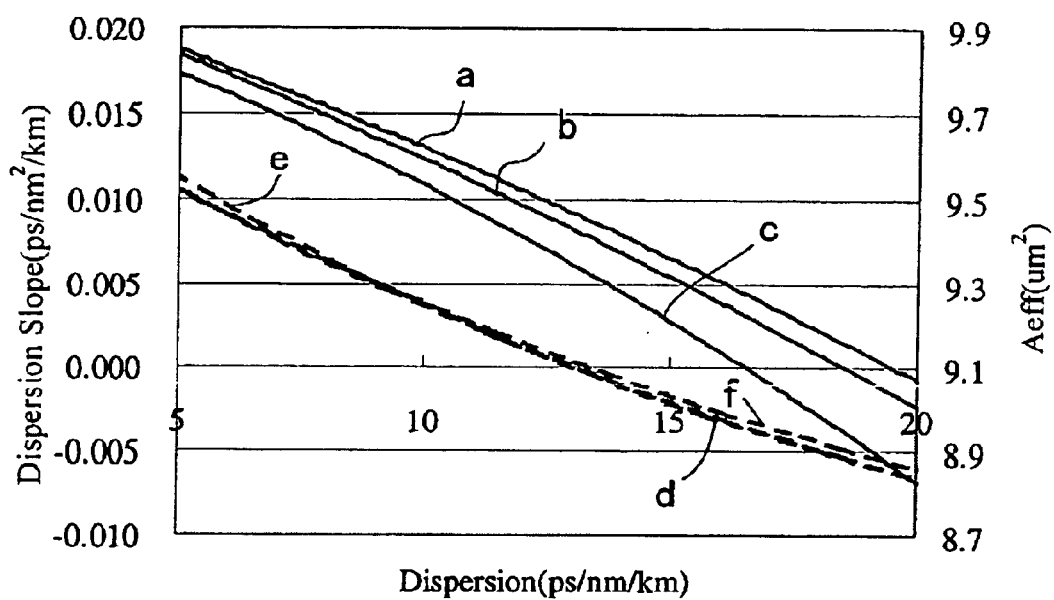
FIG. 5 is a graphics to plot characteristic curves resulting from variations in the relative refractive index difference of a third core with a W-shape profile having a third core layer.
Figure 6:
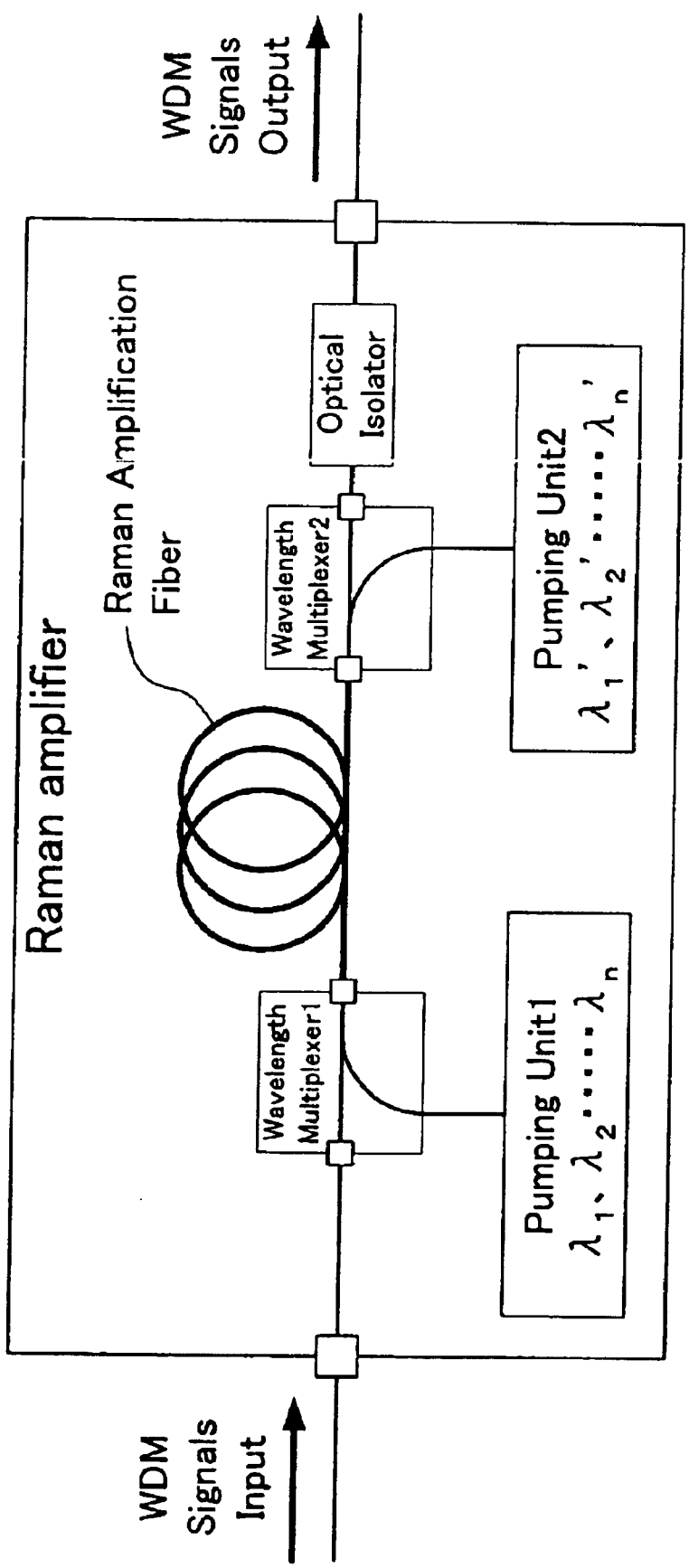
FIG. 6 is a schematic to show the structure of an optical amplifier applying one optical fiber in the invention to form a Raman amplification component.
Figure 7:
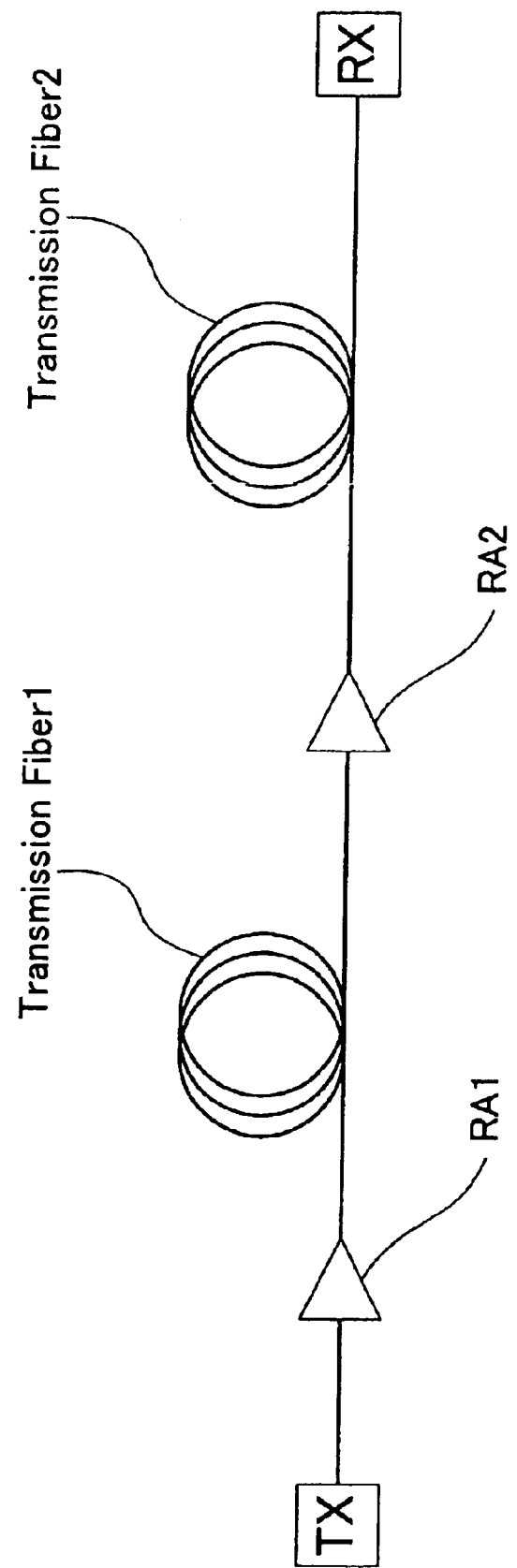
FIG. 7 is a schematic to show the structure of an optical transmission system amplifier applying one optical fiber in the invention to form a Raman amplification component, which is connected to an optical transmission line.

As a result, FIG. 5 presents the relationship between dispersion, dispersion slope and effective area at 1.55 μm.

Curve "a" refers to the dispersion slope with Δ3=0%; curve "b", dispersion slope with Δ3=0.1%, and curve "c", dispersion slope with Δ3=0.3%, each at 1.55 μm.

In addition, curve "d" refers to the effective area with Δ3=0%; curve "e", effective area with Δ3=0.1%, and curve "f", dispersion slope with Δ3=0.3%, each at 1.55 μm.

As interpretable from FIG. 5, the stepwise increment of relative refractive index difference (Δ3) as 0, 0.1% and 0.3% turned out to enable lowering the dispersion slope at 1.55 μm, without significantly enlarging the effective area. For instance, with a set dispersion at 1.55 μm of 15 ps/nm/km in absolute value, adjusting the relative refractive index difference (Δ3) to 0.3%, it turned out that the dispersion slope at 1.55 μm declined ultimately, reaching 0.0025 ps/nm²/km or thereabout.

In addition, enlarging the diameter of the third core 3 (2c) turned out to accompany a link action for lowering the dispersion slope at 1.55 μm.

Yet if the refractive index difference (Δ3) or the diameter of the third core 3 (2c) is extremely increased, the cutoff wavelength (λc) will exceed 1350 nm, or the effective area will go over 15 μm². Consequently, key parameters for the optimum performance were cleared up, namely, relative refractive index difference: 0.45% or lower, diametric ratio of the third core 3 (2c) to the second core 2 (2b): 1.8 or less, which were applied to adjust the counterpart parameters in the second embodiment.

Table 2 presents the virtual performance characteristics of simulated optical fibers in the second embodiment: refractive index profiles, measured parameters at 1.55 μm.

TABLE 2

| $\Delta 1$ % | $\alpha$ | $\Delta 2$ % | $\Delta 2$ % | a/b | c/b | Core Diameter $\mu$m | Dispersion ps/nm/km | Dispersion Slope ps/nm²/km | Aeff $\mu$m² | $\lambda c$ nm | Bending Loss dB/m |
|---|---|---|---|---|---|---|---|---|---|---|---|
| 2.4 | 5 | −0.90 | 0.10 | 0.32 | 1.40 | 10.6 | −19.2 | −0.001 | 8.7 | 978 | 0.2 |
| 2.4 | 10 | −0.90 | 0.10 | 0.30 | 1.45 | 10.6 | −15.1 | 0.002 | 8.9 | 1019 | 0.1 |
| 2.4 | 6 | −0.70 | 0.15 | 0.29 | 1.50 | 11.3 | −14.1 | 0.011 | 9.5 | 1045 | 0.2 |
| 2.1 | 6 | −0.90 | 0.10 | 0.30 | 1.40 | 10.8 | −19.7 | −0.008 | 9.6 | 923 | 0.4 |
| 2.1 | 7 | −0.90 | 0.12 | 0.30 | 1.60 | 11.2 | −13.8 | 0.004 | 9.8 | 959 | 0.3 |
| 2.4 | 10 | −0.50 | 0.10 | 0.40 | 1.60 | 8.2 | −17.3 | −0.002 | 10.0 | 1105 | 0.0 |

As apparent from Table 2, each simulated optical fiber in the second embodiment displays a high non-linearity and a low dispersion, similarly in the first embodiment, bringing out all but the same performance as the first does.

Embodiment

Now explained are substantial optical fibers in the first embodiment and the second embodiment, i.e., tangible data in bold numbers in the forth row from the top in Table 1 is substantiated to be a trial optical fiber, targeting in relative refractive index difference $\Delta 1=2.4\%$, $\alpha=2$, relative refractive index difference $\Delta 2=-0.9\%$, a/b=0.30, core diameter= 12.0 $\mu$m. This trial optical fiber 1 is described in No. 1, Table 3.

Note: The cutoff wavelength was found in a test method described in ITU-T G. 650.1.

TABLE 3

| No. | Dispersion ps/nm/km | Dispersion Slope ps/nm²/km | $\lambda_0$ nm | Transmission Loss dB/km | Aeff $\mu$m² | $n_2$/Aeff $10^{-10}$/W | $\lambda c$ nm | Bending Loss dB/m | PMD ps/√km |
|---|---|---|---|---|---|---|---|---|---|
| 1 | −13.7 | 0.014 | 2132 | 0.57 | 9.8 | 45.0 | 1026 | 0.1 | 0.11 |
| 2 | −16.0 | 0.002 | 2735 | 0.58 | 9.1 | 49.1 | 1053 | 0.2 | 0.14 |

Additionally, tangible data in bold numbers in the second row from the top in Table 2 is substantiated to be a trial optical fiber, targeting in relative refractive index difference $\Delta 1=2.4\%$, $\alpha=10$, relative refractive index difference $\Delta 2=-0.9\%$, a/b=0.3, c/b=1.45, core diameter(2b)=10.6 $\mu$m. This trial optical fiber 2 is described in No. 2, Table 3.

Notably, "n2" in Table 3 forms a non-linear refractive index. As manifest in Table 3, trial optical fibers 1 and 2 are fine and favorable in dispersion and non-linearity, in unison with the forgoing simulation. Thus, the n2/Aeff value reached as high as 45.0 e-10/W.

Meanwhile, noteworthy are no more than 1350 nm of cutoff wavelength, no more than 1.0 dB/m of bending loss in a bending diameter of 20 mm at 1.55 $\mu$m, and being fairly low in polarization mode dispersion (PMD) at 1.55 $\mu$m.

Similarly, significant findings are as follows: Trial optical fibers 1 and 2 are with a zero-dispersion wavelength of no shorter than 2000 nm, far apart from their operating wavelength band, so FWM suppressed £ both the transmission band and the Raman amplification band. Then, both the trial fibers showed rather low in transmission loss and PMD.

The present invention can not be limited to the foregoing embodiments, simulated fibers or trial fibers. For instance, the first or second embodiment may apply not fewer than four layers to the core 4, although the former applied two layers (first and second cores), and the latter, three (first, second and third cores).

Optical fibers according to the present invention would preferably fall within the ranges of zero-dispersion wavelength and transmission loss at 1.55 $\mu$m, which arose in of the referenced embodiments, simulated optical fibers or trial optical fibers, but little difference might not be a problem.

The present invention provides optical fibers displaying high non-linearity and low dispersion, thereby, for instance, enabling high-efficiency Raman amplification to perform in an optical transmission line without significantly disturbing the managed dispersion.

The present invention provides optical fibers with a cutoff wavelength of 1400 nm or shorter, which can operate in a single-mode in both the wavelength band of optical signals and the wavelength band of pump light, with a design for Raman amplification WDM transmission astride the C-band and L-band. In addition, their low bending loss enables reliable optical transmission. Notably, readjusting the cutoff wavelength to 1350 nm or shorter can realize the same results over a wide-band covering the S-band, C-band and L-band.

Optical fibers based on the present invention, if adjusted to a zero-dispersion wavelength of no longer than 1400 nm or no shorter than 1650 nm, and engaged in the Raman amplification WDM transmission astride the C-band and L-band for optical signals, can make the influence of a FWM suppressed, thereby enabling even better WDM transmission in the same bands. In addition, readjusting the cutoff wavelength to 1350 nm or shorter can bring about the above results over the three bands: S-band, C-band and L-band.

Optical fibers based on the present invention, if adjusted to a transmission loss of 1.0 dB/km or lower at 1.551 $\mu$m, can suppress the transmission loss at 1.55 $\mu$m, thereby enabling high-efficiency optical transmission with the aid of Raman amplification.

Optical fibers based on the present invention, can be ones easy and sure to display the above results, if attached with a tangible refractive index profile.

An optical amplifier based on the present invention, which apply the optical fibers to exhibit the above superior results, can carry out Raman amplification with high efficiency and low dispersion if made to form Raman amplifiers.

An optical transmission system, in which the above optical fibers to exhibit the above superior results are involved, can be a superior one to carry out high-efficiency Raman amplification if connected to an optical transmission line, without significantly affecting the managed dispersion.

What is claimed is:

1. An optical fiber with core and cladding which is characterized by:
   an effective area of no more than 15 $\mu m^2$ at a wavelength of 1.55 $\mu m$,
   a dispersion slope of no more than 0.05 ps/nm$^2$/km in absolute value at a wavelength of 1.55 $\mu m$,
   a dispersion of no less than 5 ps/nm/km and no more than 20 ps/nm/km in absolute value at a wavelength of 1.55 $\mu m$,
   a cutoff wavelength of no more than 1400 nm, and
   a bending loss of no more than 5.0 dB/m in a bending diameter of 20 mm at a wavelength of 1.55 $\mu m$.

2. An optical fiber as described in claim 1, which is further characterized by:
   a zero-dispersion wavelength of no longer than 1400 nm or no less than 1650 nm.

3. An optical fiber as described in claim 1, which is further characterized by:
   a transmission loss of no more than 1.0 dB/km at a wavelength of 1.55 $\mu m$.

4. An optical fiber as described in claim 1, wherein said core has a first core at the center and one layer or a plurality of layers surrounding said first core, and said layer or at least one of said layers has a relative refractive difference of no more than −0.4% from said cladding.

5. An optical fiber as described in claim 4, wherein said first core is higher than said cladding in refractive index; said first core borders on a second core surrounding said first core; and said second core is lower than said cladding in refractive index.

6. An optical fiber as described in claim 5, wherein said first core has an α-profile, "α" of said α-profile is 1.5 or larger; and said first core has a relative refractive index difference of no less than 1.8% from said cladding.

7. An optical fiber as described in claim 6, wherein said second core has a relative refractive index difference of no more than −0.6% from said cladding; and a diametric ratio of said second core to said first core is 2.2 or larger.

8. An optical fiber as described in claim 4, wherein:
   said first core is higher than said cladding in refractive index;
   said first core borders on a second core surrounding said first core;
   said second core is lower than said cladding in refractive index;
   said second core borders on a third core surrounding said second core; and
   said third core is higher than said cladding, but lower than said first core in refractive index.

9. An optical fiber as described in claim 8, wherein said third core has a relative refractive index difference of no more than −0.45% from said cladding; and a diametric ratio of said third core to said second core is 1.8 or larger.

10. A Raman amplifier containing an optical fiber as recited in claim 1.

11. An optical transmission system containing at least an optical fiber as recited in claim 1 for a Raman amplification.

* * * * *